United States Patent
de Guillebon

[11] 3,780,979
[45] Dec. 25, 1973

[54] ADJUSTABLE FUNDUS ILLUMINATION
[75] Inventor: Henri F. de Guillebon, South Hamilton, Mass.
[73] Assignee: Clinitex, Inc., Danvers, Mass.
[22] Filed: May 12, 1972
[21] Appl. No.: 252,838

[52] U.S. Cl. ...................... 351/16, 350/96 B, 351/7, 351/14, 351/39
[51] Int. Cl. ........ G02b 5/16, A61b 3/10, A61b 3/14
[58] Field of Search ........................ 351/1, 6, 7, 16, 351/39, 14; 350/96 B

[56] References Cited
UNITED STATES PATENTS
3,664,730  5/1972  Cardona ........................... 351/16 X
3,630,602  12/1971  Herbert ............................... 351/16
3,698,099  10/1972  Matsura ............................. 351/7 X FOREIGN PATENTS OR APPLICATIONS
964,567  7/1964  Great Britain ........................ 351/16
1,461,672  11/1966  France ................................... 351/16

Primary Examiner—Paul A. Sacher
Attorney—Thomas C. Stover, Jr.

[57] ABSTRACT

Method and apparatus are provided for wide angle illumination of the fundus of the eye. Even illumination of the fundus is obtained by adjustment of the input light to the optical fibers which controls the light beam transmitted from the fibers and the intensity and distribution thereof on the fundus.

13 Claims, 6 Drawing Figures

PATENTED DEC 25 1973　　　　　　　　　　　　　　3,780,979
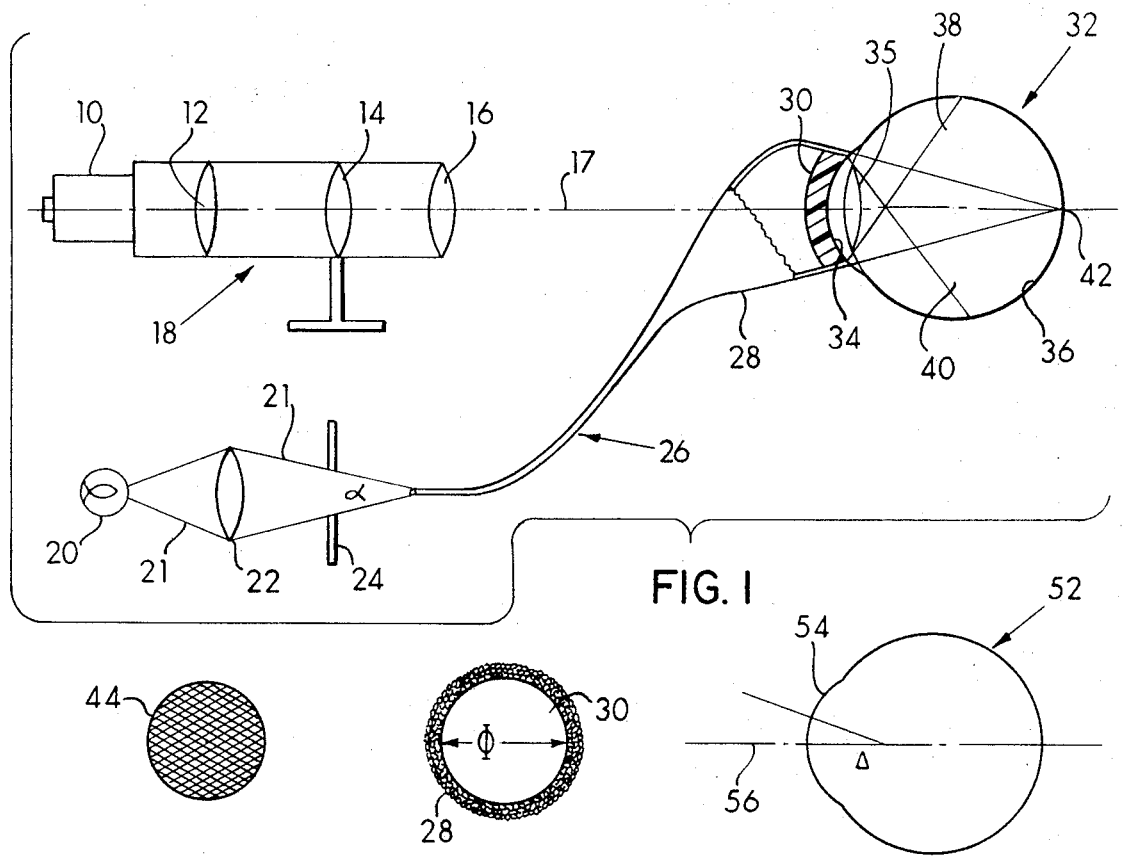
FIG. 1
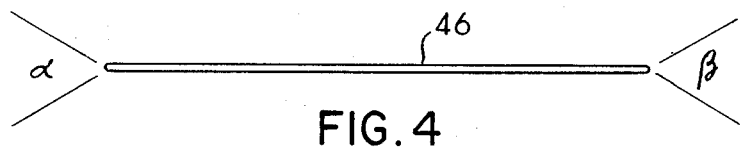
FIG. 3　　FIG. 2　　FIG. 5
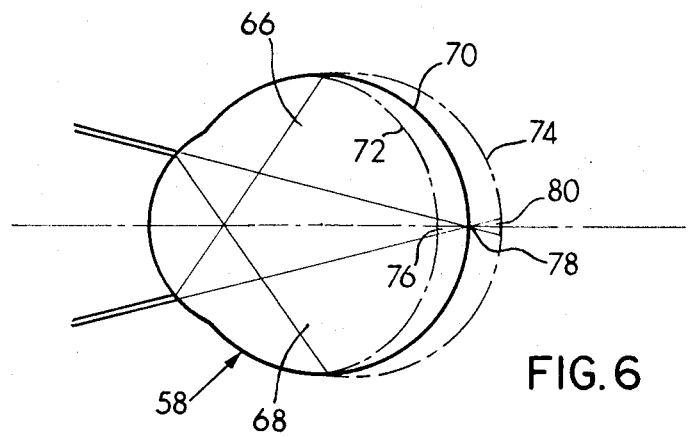
FIG. 4
FIG. 6

ADJUSTABLE FUNDUS ILLUMINATION

FIELD OF THE INVENTION

This invention relates to a method and apparatus for illuminating the eye particularly for controlling illumination of the fundus of the eye.

THE PRIOR ART

Adequate examination and treatment of the eye interior eg., the fundus requires proper illumination. Proper illumination is particularly important to obtain clear photographs of the fundus.

Present photographic techniques provide for photographing the eye through a series of lenses, the fundus being illuminated by a direct beam of light. This type of lighting however presents only about a 30° angle of illumination of the fundus and then only a small portion thereof can be photographed. To obtain wider angle lighting and photographic coverage, it is necessary to aim light and camera at the pupil at different angles and take many photographs to obtain a composite photograph of the fundus.

Wide angle cameras (up to 130° or more) have recently been developed and the above illumination of the fundus is highly inadequate therefor. Efforts have been made to obtain wider angle illumination of the fundus. To this end fiber optics illumination has been employed wherein light is transmitted through a bundle of fibers to a lens placed in contact with the eye. The fibers, placed around the periphery of the lens in a ring illuminate the fundus of the eye like a series of spot lights. Ideally, the spot lights neither significantly overlap nor have appreciable gaps or shadows therebetween and even lighting is obtained, when such illumination system is applied to the normal eye. However, in abnormal eyes, eyes myopic and hypermetropic eyes and even in many normal eyes, even illumination is not obtained, the spot lights overlapping significantly and creating bright spots or gaps appearing between such spot lights, creating shadows with resultingly low-quality pictures. In addition, some of the light beams transmitted from the fibers reflect from the crystalline lens of the eye back to the camera or observer further impairing the visibility and picture quality of the fundus.

There is, therefore, a need and market for an illuminating system which provides even illumination for virtually all types of eyes with resultingly clear photographs and visual examination.

Broadly, the present invention provides a method and apparatus for readily adjusting the illumination to evenly light the individual eye fundus.

This is accomplished in the present invention which provides a method and apparatus for illuminating the fundus of the eye comprising, projecting light rays through a plurality of transparent optical fibers into the fundus of the eye and varying the acceptance angle $\alpha$ of light entering the receiving end of the fibers to change the output angle of said light exiting from the transmitting end of said fibers to control the quality of the illumination of the fundus.

The invention will become more apparent from the following detailed specification and drawings in which:

FIG. 1 is a fragmentary elevation view of an apparatus embodying the present invention;

FIG. 2 is a frontal view of a portion of the apparatus of FIG. 1;

FIG. 3 is a view of a filter employed in the apparatus of FIG. 1;

FIG. 4 is a schematic view of the bundle of fibers in FIG. 1;

FIG. 5 is a schematic view of the eye angle of illumination and

FIG. 6 is a schematic view of several types of eyes superimposed and the illumination of the fundus thereof.

Referring now to the drawings, camera 10 aligned with lenses 12, 14 and 16 is sighted on eye 32 through contact lens 30 as shown in FIG. 1.

Lamp 20 transmits a beam 21 through lens 22, which directs beam 21 to the receiving end of fiber optical bundle 26 which transmits the beam through contact lens 30 and into the eye 32 and onto the fundus 36 thereof. The optical fibers 28 which are ringed around lens 30, as shown in FIG. 2, direct the light into the eye in conical sections 38 and 40 onto the fundus 36 as shown in FIG. 1. The fundus, thus illuminated at a wide angle, is readily observed or photographed by camera 10 as shown in FIG. 1. Where conical light sections 38 and 40 abut, as at confluence 42, even illumination is obtained and a clear picture of the fundus results. Where conical light sections 38 and 40 overlap or have gaps between them, uneven illumination results and with it a photograph of low clarity.

Typically in a normal eye, the light cones 66 and 68 abut on the fundus 70 with no gap or overlap at the light confluence 78 and even illumination and clear photograph results as shown in FIG. 6.

In a myopic eye, however, the light cones 66 and 68 illuminate the fundus 72 with gap 76 at the center region thereof, and a shadowed illumination results as shown in FIG. 6.

In a hypermetropic eye, the projected light cones 66 and 68 intersect and overlap on the fundus 74 with a corresponding bright spot at confluence 80 at the center region thereof with the resultant uneven illumination and low quality photograph of the fundus 74 as shown in FIG. 6.

The uneven illumination of the fundus illustrated in FIG. 6 can be corrected by changing the light transmittal angle $\beta$ of the light cones projected on the eye fundus until the light cones as projected neither appreciably overlap nor are separated by shadow gaps but abut for even illumination. This is accomplished by varying the acceptance angle $\alpha$ of the light to the receiving end of the fibers 46. Adjusting the input angle $\alpha$, thus results in a corresponding adjustment of the projected light transmittal angle $\beta$ toward the fundus as shown in FIG. 4.

The acceptance angle $\alpha$ is varied, for example, by employing a diaphragm 24 shown in FIG. 1 which contracts or expands and changes said angle $\alpha$ of the input light beam 21.

Acceptance angle $\alpha$ is also changed by relatively moving the lamp 20 and lens 22 (or lenses) shown in FIG. 1 relative to each other eg., refocusing.

Acceptance angle $\alpha$ is also modified by inserting between lamp 20 and optical fiber bundle 26, a light filter 44, shown in FIG. 3 which substantially filters out the center rays of beam 21 before the light enters the optical fiber bundle and reduces the intensity of the light beam or portions thereof, reaching the fiber bundle 26 and subsequently the fundus 36 of FIG. 1. Filter 44 can also modify acceptance angle $\alpha$ and accordingly vary the light transmittal angle β and the resultant illumination of the fundus 36.

As shown above, the invention provides method and apparatus for readily obtaining even illumination of the fundus of various eye types. The light transmitted to the input end of the optical fiber bundle can be adjusted in angle and intensity to obtain the even illumination desired across the rear hemisphere (posterior pole) of the fundus, or about 130°, which includes the vascularization area of the fundus. With the wide angle cameras now being developed, nearly the entire posterior pole of the fundus can be photographed with one take with great clarity, as opposed to the many takes at various acute angles (with the optical axis of the eye) required by the presently available fundus illumination systems (eg., about 30° illumination), which require multicomponent composite pictures of the fundus.

The optical fibers connect at their exit end 28 with a contact lens 30 in a ring pattern as shown in FIG. 2, defining therein a circular window of diameter Φ through which the fundus is viewed and photographed. It is preferred that the size of the ring diameter Φ be 6.0 mm to 8.0 mm to avoid reflections of the transmitted light beam on the crystalline lens of the eye. Said contact lens has an index of refraction of 1.7 or more, preferably 1.8.

As for the angle of illumination, the angle at which the ring of optical fibers beam light into the eye, the angle Δ shown in FIG. 5 is preferably between 25° and 32° with the optical axis 56 of the eye 52. Preferably the fibers terminate at an angle normal to the cornea 54 of the eye.

The above condition of ring diameter Φ and illumination angle Δ are suitable for even illumination of certain normal eyes. For the abnormal eye, eg., the myopic and hypermetropic eye, and even some normal or emmetropic eyes, examples of which are shown in FIG. 6, correction of the intensity of the light transmitted to the input end of the optical fiber bundle will adjust the output intensity of the light beam to the eye until even illumination of the fundus is obtained as discussed above.

As stated above, control of the transmitted light is obtained:

a. by diaphragming the cone of light beamed to the input end of the fiber bundle,
b. by changing the focus of the illuminating lamp eg. by axial movement of lens 22 in FIG. 1, or
c. by inserting an appropriate lens filter, denser at the center than at the edges.

Various types of filters can be employed, for example, discs of metal, cellulose material, including cardboard, plastic and the like. Filters of other materials can also be employed, including gelatin filters, glass filters having a film deposition thereon and the like. One or more such filters can be employed.

The optical fibers can be made of glass or plastic and have a diameter of 1 to 6 to 50 mils. Plastic fibers have a numerical aperture (index of refraction) of about 0.40 or less. Glass fibers have a numerical aperture of about 0.40 to 0.66 or larger. Preferred are glass fibers of 2 to 3 mils diameter, having a numerical aperture of 0.66.

The optical fiber cable can be any length desired. However, 12 inches is a convenient length.

The number of fibers in the bundle are enough to provide suitable illumination of the fundus and preferably number in the thousands.

The size of the fiber bundle ranges from one-eighth to one-half inch or more.

The intensity of the illuminating lamp is up to 18 watts or more.

What is claimed is:

1. A method for illuminating the fundus of the eye comprising projecting light rays through a plurality of transparent optical fibers into the fundus of the eye and varying the acceptance angle α of the light entering the receiving end of said fibers to change the intensity of the light exiting from the transmitting end of said fibers to control the quality of the illumination of said fundus.

2. The method of claim 1, wherein the acceptance angle α of light entering the receiving end of said fibers is varied to change the transmittal angle β of the light transmitted by said fibers, to control the quality of illumination of said fundus.

3. The method of claim 1 wherein (the size of the illuminated areas on said fundus from each fiber is controlled to prevent excessive overlapping thereof) said acceptance angle α is varied to control the size of illuminated areas from each fiber on the fundus of the eye to prevent excessive overlap thereof and to prevent significant gaps between said illuminated areas to obtain uniform fundus illumination.

4. The method of claim 1 wherein the acceptance angle is controlled by changing the relative distance between light source and lens to change the input light beam to project said light at different acceptance angles.

5. The method of claim 1 wherein the acceptance angle is controlled by varying the aperture of a diaphragm placed between said light source and the input end of the optical fiber bundle.

6. The method of claim 1 wherein a filter which selectively admits desired light patterns therethrough is placed in the path of the input light beam before the input end of said fibers to change the acceptance angle α thereof, to vary the intensity of illumination of desired areas on said fundus.

7. An apparatus for evenly illuminating the fundus of the eye comprising a light source for projecting a light beam, an optical fiber bundle having a light receiving end for receiving said beam and a light transmitting end for transmitting said beam into said eye and illuminating the fundus thereof and means to vary the acceptance angle α of the light transmitted to said receiving end to vary the intensity of the light beamed to the fundus, to control the quality of the illumination thereof.

8. The apparatus of claim 7 wherein said transmitting end is connected to a contact lens for holding said end in close contact with said eye.

9. The apparatus of claim 7 wherein said transmitting end has said fibers contacting said lens in an annular ring of diameter Φ which encloses a portal for observation of said fundus.

10. The apparatus of claim 7 having a bundle of optical fibers of large numerical aperture and a diaphragm positioned between said light source and the receiving end of said bundle.

11. The apparatus of claim 7 having a diaphragm interposed between said light source and said receiving end and means for adjusting said diaphragm to vary the acceptance angle of the light beamed to said receiving end.

12. The apparatus of claim 7 having means for relatively moving at least one lens positioned between said light source and said receiving end to vary the acceptance angle of the light beamed to said receiving end.

13. The apparatus of claim 7 having a filter which selectively admits desired light patterns therethrough, placed between said light source and said receiving end to vary the acceptance angle $\alpha$ thereof and vary the intensity of illumination of desired areas on said fundus.

* * * * *